US012766548B2

(12) United States Patent
Farina et al.

(10) Patent No.: US 12,766,548 B2
(45) Date of Patent: Oct. 20, 2026

(54) METHOD FOR MANAGING COATING GLOSS ON A COIL-COATING LINE

(71) Applicant: ArcelorMittal, Luxembourg (LU)

(72) Inventors: Fabrice Farina, Flémalle (BE); Jacky Mallegol, Villers le Temple (BE); Eric Silberberg, Haltinne (BE); Charles Hanquet, Liège (BE); Thomas Defize, Eben-Emael (BE)

(73) Assignee: ArcelorMittal, Luxembourg (LU)

( * ) Notice: Subject to any disclaimer, the term of this patent is extended or adjusted under 35 U.S.C. 154(b) by 161 days.

(21) Appl. No.: 18/716,389

(22) PCT Filed: Dec. 9, 2022

(86) PCT No.: PCT/IB2022/061968
§ 371 (c)(1),
(2) Date: Jun. 4, 2024

(87) PCT Pub. No.: WO2023/053107
PCT Pub. Date: Apr. 6, 2023

(65) Prior Publication Data
US 2025/0018424 A1 Jan. 16, 2025

(30) Foreign Application Priority Data
Dec. 15, 2021 (WO) .................. PCT/IB2021/061770

(51) Int. Cl.
*B05D 3/06* (2006.01)
*B05D 3/02* (2006.01)
(Continued)

(52) U.S. Cl.
CPC ........... *B05D 3/067* (2013.01); *B05D 3/0263* (2013.01); *B05D 5/06* (2013.01); *B05D 7/14* (2013.01);
(Continued)

(58) Field of Classification Search
CPC .............................. B05D 3/0209; B05D 3/068
See application file for complete search history.

(56) References Cited

U.S. PATENT DOCUMENTS 3,783,004 A * 1/1974 Parker ...................... B05D 5/02
522/182
6,333,076 B1 12/2001 Sigel et al.
(Continued)

FOREIGN PATENT DOCUMENTS

CN 1572380 A 2/2005
CN 107486380 A * 12/2017 ............ B05D 3/068
(Continued)

OTHER PUBLICATIONS

CN-107486380-A English translation. (Year: 2017).*
(Continued)

*Primary Examiner* — Hai Y Zhang
(74) *Attorney, Agent, or Firm* — Davidson Kappel LLC

(57) ABSTRACT

A method for managing the gloss of an organic coating formed on a moving strip on a coil-coating line, the method including the steps of: 1) Setting a set gloss value $G_s$, a set gloss range $R_s$ and a proportionality constant K of a predefined linear mathematical relation between the temperature of the wet film before UV curing and the gloss, 2) Collecting the measure of the temperature T of the wet film in at least a width portion of the moving strip upstream of the UV curing device and collecting the measure of the gloss G, 3) Correcting a deviation of the measured gloss G beyond $R_s$, this step including a sub-step of calculating the corrected temperature $T_c$ to be reached by the wet film in the width portion upstream of the UV curing device according to equation: $T_c=T+K(G-G_s)$.

21 Claims, 5 Drawing Sheets

(51) Int. Cl.
*B05D 5/06* (2006.01)
*B05D 7/14* (2006.01)
*B05C 1/08* (2006.01)

(52) U.S. Cl.
CPC ........ *B05C 1/0826* (2013.01); *B05D 2202/10* (2013.01); *B05D 2252/02* (2013.01)

(56) References Cited

U.S. PATENT DOCUMENTS

| | | | | |
|---|---|---|---|---|
| 6,569,500 | B1 | 5/2003 | Sigel et al. | |
| 2002/0168501 | A1* | 11/2002 | Sigel | C09D 5/00 428/195.1 |
| 2003/0148039 | A1 | 8/2003 | Blum et al. | |
| 2004/0241416 | A1 | 12/2004 | Tian et al. | |
| 2009/0074976 | A1 | 3/2009 | Freking et al. | |
| 2010/0021698 | A1 | 1/2010 | Chretien et al. | |
| 2017/0072434 | A1 | 3/2017 | Yapel et al. | |
| 2018/0029385 | A1 | 2/2018 | Mataki et al. | |

FOREIGN PATENT DOCUMENTS

| | | | |
|---|---|---|---|
| DE | 102006042063 | A1 | 3/2008 |
| EP | 1072325 | A2 | 1/2001 |
| EP | 1228813 | A2 | 8/2002 |
| JP | H0330875 | A | 2/1991 |
| JP | 2010534132 | A | 11/2010 |
| WO | WO81/00683 | A1 | 3/1981 |
| WO | WO0164794 | A2 | 9/2001 |
| WO | WO2012019777 | A1 | 2/2012 |

OTHER PUBLICATIONS

Stowe et al.: " UV Q&A: Temperature and UV Curing; Question: How does temperature affect UV Curing? controlled, is it measured?", Jun. 9, 2017.

Search Report of PCT/IB2022/061968 of Feb. 15, 2023 and International Report on Patentability.

* cited by examiner

METHOD FOR MANAGING COATING GLOSS ON A COIL-COATING LINE

The present invention relates to a method for managing the gloss of an organic coating applied on a moving strip on a coil-coating line. In particular, the moving strip is a metallic-coated steel strip.

BACKGROUND

Coil coating is a continuous, automated process for coating metal before fabrication into end products. The steel or aluminum substrate is delivered in coil form from the rolling mills. The metal coil is positioned at the beginning of the coil-coating line, and in one continuous process, the coil is unwound, pre-cleaned, pre-treated, pre-primed, and pre-painted before being recoiled on the other end and packaged for shipment.

The product obtained by this process is a prepainted metal, also referred to as coil-coated metal, prefinished metal or pre-coated metal. It is commonly used in construction applications as well as appliances.

SUMMARY OF THE INVENTION

The paints traditionally used for coil-coating are solvent-based paints. Nevertheless, there have been a recent interest in radiation curing, which is the curing of materials using ultraviolet (UV processes) or electron beam (EB curing processes). The corresponding paints, known as radcure paints, are solvent-free and the curing process is triggered by either exposure to a high-energy UV light, possibly in conjunction with suitable photoinitiators, or exposure to accelerated electrons. Photoinitiators absorb UV light and generate free radicals. The latters react with double bonds of monomers causing chain reaction and polymerization. For UV-C and electron beam (EB) curing, initiators are not required. The high radiant energy produces sufficient reactive species (radicals) for polymerization to proceed spontaneously.

One of the specificities of radcure paints is to generate organic coatings with a high gloss due to high tension of the coating surface. To reduce this gloss and reach the requirements of the pre-painted markets (gloss typically between 15 and 30 GU for the construction market) paint suppliers add matting agents, as for solvent-based paints. However, the radcure paints being quite viscous due to the absence of solvent, only small amounts of matting agent can be added and it does not allow for low gloss levels. In addition, the migration of matting agents to the coating surface to achieve the desired gloss level is also very limited due to the speed of the curing process of radcure paints compared to solvent-based paints (1-2 seconds versus 12-25 seconds).

One way to mitigate this problem is known from WO81/00683 which discloses a curing process wherein the coating is first irradiated with curing radiation of wavelengths to which the coating is responsive but having substantially no distribution beneath about 300 nm (such as UV), and is subsequently irradiated with curing radiation of wavelengths to which the coating is responsive including substantial radiation at wavelengths beneath 300 nm (such as EB). This double curing is known as dualcure. Gloss control is obtained by adjusting on-line parameters including the spectral distribution, the intensity, or the dose of the initial radiation, or the time interval between the initial and subsequent irradiation steps.

It has nevertheless been observed that these on-line parameters are not enough to manage the gloss efficiently and in a reproducible way.

An aim of the present invention is to remedy the drawbacks of the process of the prior art by providing a method for managing, efficiently and in a reproducible way, the gloss of an organic coating formed by application and curing of a wet film of a radcure paint on a moving strip on a coil-coating line.

A first subject of the present invention consists of a method for managing the gloss of an organic coating formed by application and curing of a wet film of a radcure paint on a moving strip on a coil-coating line comprising, sequentially along the path P of the moving strip, a paint applicator, a heating device comprising an infrared heater, an Ultra-Violet curing device and an Electron-Beam curing device, the method comprising the steps of:

- Setting a set gloss value $G_s$ of the organic coating, a set gloss range $R_s$ of the gloss of the organic coating and a proportionality constant K of a predefined linear mathematical relation between the temperature of the wet film before Ultra-Violet curing and the gloss of the organic coating after Electron-Beam curing,
- Collecting the measure of the temperature T of the wet film in at least a width portion of the moving strip downstream of the infrared heater and upstream of the Ultra-Violet curing device and collecting the measure of the gloss G of the organic coating in the at least a width portion downstream of the Electron-Beam curing device,
- Correcting a deviation of the measured gloss G beyond the set gloss range $R_s$ by calculating the corrected temperature $T_c$ to be reached by the wet film, in the at least a width portion downstream of the infrared heater and upstream of the Ultra-Violet curing device, according to equation 1:

$$T_c = T + K(G - G_s) \quad (1)$$

The method according to the invention may also have the optional features listed below, considered individually or in combination:

- calculating the corrected temperature $T_c$ is a sub-step of the correcting step,
- the correcting step further comprises a sub-step of adjusting a setting of the coil-coating line taking into account the calculated corrected temperature $T_c$,
- the method further comprises an initial line setting step wherein:
  - a plurality of process parameters and/or of specifications of the strip are collected,
  - at least one initial line condition among the initial power $PW_0$ of the infrared heater, the initial UV dose $D_0$ of the Ultra-Violet curing device and the initial length $L_0$ between the Ultra-Violet curing device and the Electron-Beam curing device is set, taking into account the process parameters and/or specifications of the strip that have been collected,
- the correcting step further comprises adjusting the power of the infrared heater so that the wet film reaches the corrected temperature $T_c$ in the at least a width portion of the moving strip downstream of the infrared heater and upstream of the Ultra-Violet curing device,
- the coil-coating line further comprises an inductor upstream of the paint applicator and wherein the correcting step further comprises adjusting the power of the inductor so that the wet film reaches the corrected temperature $T_c$ in the at least a width portion of the moving strip downstream of the infrared heater and upstream of the Ultra-Violet curing device, the Ultra-Violet curing device comprises a UV module, the setting step further comprises setting a maximum temperature $T_{max}$ for the radcure paint, the collecting step further comprises collecting the UV dose D of the UV module, the correcting step further comprises the sub-steps of:

Evaluating if $T_c$ is superior to $T_{max}$,

If not, adjusting the power of the infrared heater so that the wet film reaches the corrected temperature $T_c$ in the at least a width portion of the moving strip downstream of the infrared heater and upstream of the Ultra-Violet curing device, If $T_c$ is superior to $T_{max}$:

calculating the corrected UV dose $D_c$ to which the wet film in the at least a width portion must be exposed in the UV module according to equation 2:

$$D_c = f_1(D, G, G_s) \tag{2}$$

the correcting step further comprises a sub-step of adjusting a setting of the coil-coating line other than the power of the infrared heater, taking into account the calculated corrected UV dose $D_c$, the correcting step further comprises adjusting the power of the UV module so that the wet film in the at least a width portion of the moving strip is exposed to the corrected UV dose $D_c$, the UV module is movable along the path P, the setting step further comprises setting a maximum UV dose $D_{max}$ to which the wet film can be exposed in the UV module, the collecting step further comprises collecting the length L between the UV module and the Electron-Beam curing device, the correcting step further comprises the sub-steps of:

If $T_c$ is superior to $T_{max}$:

Evaluating if $D_c$ is superior to $D_{max}$,

If not, adjusting the power of the UV module so that the wet film in the at least a width portion of the moving strip is exposed with the corrected UV dose $D_c$, If $D_c$ is superior to $D_{max}$, calculating the corrected length $L_c$ between the UV module and the Electron-Beam curing device according to equation 3:

$$L_c = f_2(L, G, G_s) \tag{3}$$

the correcting step further comprises a sub-step of adjusting a setting of the coil-coating line other than the power of the infrared heater and than the power of the UV module, taking into account the calculated corrected length $L_c$, the correcting step further comprises adjusting the length between the UV module and the Electron-Beam curing device to the corrected length $L_c$ so that the gloss of value $G_s$ is obtained on the organic coating in the at least a width portion of the moving strip downstream of the Electron-Beam curing device, the heating device comprises a plurality of infrared heaters IR, IR', IR" . . . $IR^i$ forming a row substantially parallel to the width of the path P, the collecting step comprises collecting the measures of the temperatures T, T', T" . . . $T^i$ of the wet film in a plurality of width portions P, P', P" . . . $P^i$ of the moving strip downstream of the infrared heaters and upstream of the Ultra-Violet curing device and collecting the measures of the glosses G, G', G" . . . $G^i$ of the organic coating in the plurality of width portions P, P', P" . . . $P^i$ downstream of the Electron-Beam curing device, the correcting step comprises, for any width portion $P^i$ independently from the others, correcting a deviation of the measured gloss $G^i$ beyond the set gloss range $R_s$ by calculating the corrected temperature $$T_c^i$$

to be reached by the wet film in the width portion $P^i$ downstream of the infrared heater $IR^i$ and upstream of the Ultra-Violet curing device according to the equation:

$$T_c^i = T^i + K(G^i - G_s) \tag{1$^i$}$$

the correcting step further comprises a sub-step of adjusting a setting of the coil-coating line taking into account the calculated corrected temperature $$T_c^i,$$

the correcting step further comprises adjusting the power of the infrared heater $IR^i$ so that the wet film reaches the corrected temperature $$T_c^i$$

in the width portion $P^i$ of the moving strip downstream of the infrared heater $IR^i$ and upstream of the Ultra-Violet curing device.

the Ultra-Violet curing device comprises a plurality of UV modules UV, UV', UV" . . . $UV^i$ forming a row substantially parallel to the width of the path P, the setting step further comprises setting a maximum temperature $T_{max}$ for the radcure paint, the collecting step further comprises collecting the UV doses D, D', D" . . . $D^i$ of the UV modules, the correcting step further comprises the sub-steps of:

Evaluating if $$T_c^i$$

is superior to $T_{max}$,

If not, adjusting the power of the infrared heater $IR^i$ so that the wet film reaches the corrected temperature $$T_c^i$$

in the width portion $P^i$ of the moving strip downstream of the infrared heater $IR^i$ and upstream of the Ultra-Violet curing device, If $$T_c^i$$

is superior to $T_{max}$:

calculating the corrected UV dose $$D_c^i$$

to which the wet film in the width portion $P^i$ must be exposed in the UV module $UV^i$ according to equation $2^i$:

$$D_c^i = f_1(D^i, G^i, G_s) \quad (2^i)$$

the correcting step further comprises a sub-step of adjusting a setting of the coil-coating line other than the power of the infrared heater $IR^i$, taking into account the calculated corrected UV dose $$D_c^i,$$

the correcting step further comprises adjusting the power of the UV module $UV^i$ so that the wet film in the width portion $P^i$ of the moving strip is exposed to the corrected UV dose $$D_c^i,$$

the UV modules are movable along the path P independently from one another, the setting step further comprises setting a maximum UV dose $D_{max}$ to which the wet film can be exposed in the UV modules, the collecting step further comprises collecting the lengths L, L', L" . . . $L^i$ between the UV modules and the Electron-Beam curing device, the correcting step further comprises the sub-steps of:

If $$T_c^i$$

is superior to $T_{max}$:

Evaluating if $$D_c^i$$

is superior to $D_{max}$,

If not, adjusting the power of the UV module $UV^i$ so that the wet film in the width portion $P_i$ of the moving strip is exposed to the UV dose $$D_c^i$$

in the UV module $UV^i$,

If $$D_c^i$$

is superior to $D_{max}$, calculating the corrected length $$L_c^i$$

between the UV module $UV^i$ and the Electron-Beam curing device according to equation $3^i$:

$$L_c^i = f_2(L^i, G^i, G_s) \quad (3)$$

The correcting step further comprises adjusting the length between the UV module $UV^i$ and the Electron-Beam curing device so that the gloss of value $G_s$ is obtained on the organic coating in the width portion $P^i$ downstream of the Electron-Beam curing device.

A second subject of the invention consists of a coil-coating line comprising sequentially a paint applicator, a heating device comprising an infrared heater, an Ultra-Violet curing device and an Electron-Beam curing device, the coil-coating line further comprising a gloss management tool for managing the gloss of an organic coating formed by application and curing of a wet film of a radcure paint on a moving strip on the coil-coating line, the gloss management tool comprising:

a setting module configured for setting a set gloss value $G_s$ of the organic coating, a set gloss range $R_s$ of the gloss of the organic coating and a proportionality constant K of a predefined linear mathematical relation between the temperature of the wet film before Ultra-Violet curing and the gloss of the organic coating after Electron-Beam curing, an acquisition module configured for collecting the measure of the temperature T of the wet film in at least a width portion of the moving strip downstream of the infrared heater and upstream of the Ultra-Violet curing device and for collecting the measure of the gloss G of the organic coating in the at least a width portion downstream of the Electron-Beam curing device, a correction module configured for correcting a deviation of the measured gloss G beyond the set gloss range $R_s$ by calculating the corrected temperature $T_c$ to be reached by the wet film, in the at least a width portion downstream of the infrared heater and upstream of the Ultra-Violet curing device, according to equation 1:

$$T_c = T + K(G - G_s) \quad (1)$$

Other characteristics and advantages of the invention will be described in greater detail in the following description.

BRIEF DESCRIPTION OF THE DRAWINGS

The invention will be better understood by reading the following description, which is provided purely for purposes of explanation and is in no way intended to be restrictive, with reference to.

DETAILED DESCRIPTION

Figure 1:
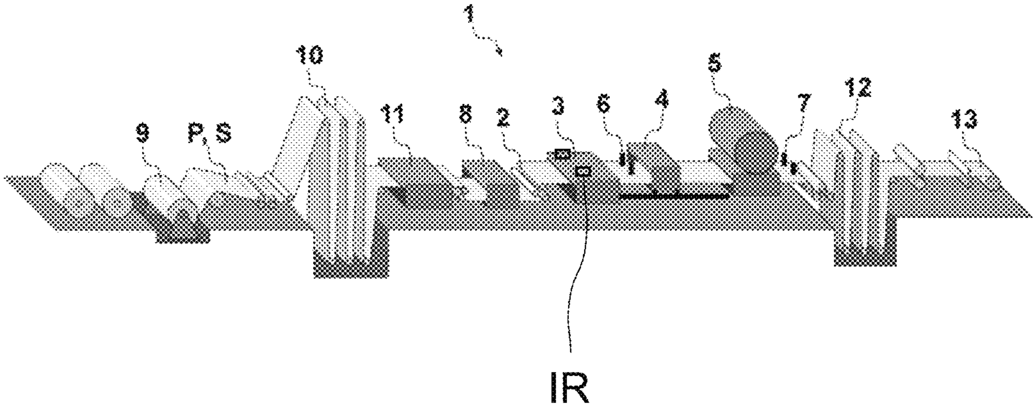
FIG. 1, which is a schematic representation of a coil-coating line.

It should be noted that spatially relative terms such as "upstream", "downstream", "lower", "upper", "above", "below", "before", "after" . . . as used in this application refer to the positions and orientations of the different constituent elements of the coil-coating line.

The method according to the invention is intended for strips, such as metallic strips. Steel, either carbon steel or stainless steel, aluminium, copper are examples of metallic strips. In particular, steel strips can be bare or coated with a metallic coating, on either one or two sides of the strip. Examples of possible metallic coated steels are galvanized steel, steels coated with a zinc alloy comprising 5 wt. % of aluminum (Galfan®), steels coated with a zinc alloy comprising 55 wt. % of aluminum, about 1.5 wt. % of silicon, the remainder consisting of zinc and inevitable impurities due to the processing (Aluzinc®, Galvalume®), steels coated with an aluminum alloy comprising from 8 to 11 wt. % of silicon and from 2 to 4 wt. % of iron, the remainder consisting of aluminum and inevitable impurities due to the processing (Alusi®), steels coated with a layer of aluminum (Alupur®), steels coated with a zinc alloy comprising 0.5 to 20% of aluminium, 0.5 to 10% of magnesium, the remainder consisting of zinc and inevitable impurities due to the processing, steels coated with an alloy comprising aluminium, magnesium, silicon, possible additional elements, the remainder consisting of zinc and inevitable impurities due to the processing.

The method according to the invention is also intended for radcure paints. The term "radcure paints" refers to radiation curable compositions that are "cured", or dried, utilizing short wavelength ultraviolet (UV) light or high-energy electrons from electron-beam (EB) sources. They usually comprise liquid monomers and oligomers, into which pigments, fillers, additives, photoinitiators can be dispersed, generally without the need for either solvent or water. They are thus substantially solvent-free.

With reference to FIG. 1, the coil-coating line 1 according to the invention mainly comprises, sequentially along the path P of the moving strip, a paint applicator 2, a heating device 3 comprising an infrared heater, an Ultra-Violet curing device 4 and Electron-Beam curing device 5.

The path P is the path followed by the strip S from its entry in the coil-coating line to its exit. It has a width and a length. Pieces of equipment are positioned along this path to perform operations on the strip.

A paint applicator 2 is a device that applies a wet film of paint on one or both sides of a strip with a set thickness of paint. In particular, its purpose is to apply the wet film of radcure paint. In the context of the invention, the technology of the paint applicator is not limited.

According to a variant of the invention, the paint applicator 2 is a paint roll-coater. It is an automated machine that coat one or both sides of a strip with rotating rolls. It is designed so that the strip passes through the machine that applies a layer of paint to one or both sides of the strip. There are numerous designs of paint roll-coaters depending on the configuration of the coil-coating line, the types of paints being used, and the types of strips being coated. The person skilled in the art will know which design is best adapted to each case. Generally speaking, the paint roll-coater comprises a paint pan, a steel or ceramic pick up roll, and a rubber covered coating roll. The purpose of the paint pan is to contain, circulate and preferably heat the paint. The pick up roll can be partially immersed in the paint and can rotate in either a clockwise or a counter clockwise direction to pick the paint up and transfer it to the coating roll. The latter transfers the paint to the strip.

According to another variant of the invention, the paint applicator 2 is a curtain coater. In that case, a curtain of paint is applied to the horizontal strip normally transverse to the curtain. The paint falls from a height under gravity from a curtain die or cascade while the strip is supported on a backing roller. This method is capable of achieving high line speeds and multilayer coatings.

Examples of other paint applicators are knife coater, dip or meniscus coater, slot coater, meter rod coater, slide coater.

The paint is usually applied with the paint applicator on the full width of the strip. By default, the width of the wet film of paint, and consequently of the organic coating, is the same as the strip width.

The paint applicator 2 is preferably equipped with at least one paint heating device suitable for heating and maintaining the paint at a set temperature. Heating the paint facilitates its application. It also further eases the gloss management as it minimizes the energy requirements at the level of the infrared heater and thus minimizes the inertia of the infrared heater. In the case of a paint roll-coater, the paint heating device can be a pan heater, i.e. a heater positioned in or around the paint pan. It can also be a temperature-controlled roll, in particular a temperature-controlled pick-up roll, possibly in combination of the pan heater. In the case of a curtain coater, the paint heating device can be a heater positioned upstream of the curtain die. It can also be a temperature-controlled backing roll, possibly in combination of the heater.

The paint applicator 2 is preferably equipped with a temperature measuring device for measuring the paint temperature and/or the wet film temperature at the level of the paint applicator. The temperature device can be, for example, a temperature sensor, a pyrometer, a thermal camera.

The coil-coating line 1 further comprises a heating device 3 comprising an infrared heater, positioned, along the path P of the moving strip, downstream of the paint applicator 2 and upstream of the Ultra-Violet (UV) curing device 4. Its purpose is to heat the wet film of radcure paint. The heating device further improves the temperature control of the wet film of paint before its surface is cured in the UV curing device. As the temperature of the strip exiting the paint applicator decreases at a rate that depends on a number of parameters (strip nature, strip width, strip thickness, line speed . . . ), the temperature of the wet film entering the UV curing device may vary significantly from time to time, which would impact the gloss detrimentally. Thanks to the infrareds which heat directly the wet film, the temperature of the wet film can be very rapidly adjusted.

According to one variant, the infrared heater covers the full width of the path P of the moving strip. In that case, the wet film is heated uniformly along its width when passing (through) the infrared heater.

According to another variant, the heating device 3 comprises a plurality of infrared heaters (IR shown solely schematically in FIG. 1) distributed in the width of the path P. In other words, the plurality of infrared heaters forms a row substantially parallel to the width of the path P, i.e. perpendicular to the moving direction of the strip. For the sake of clarity, the infrared heaters described here are independent from each other and positioned adjacent to each other but they can be physically inseparable from each other. They can be individually-controllable portions of a single heating device.

Thanks to this design, temperature variations in the strip width can be corrected and minimized. Preferably, the temperature variation of the wet film in the strip width at the exit of the heating device is below 1° C. It improves the gloss homogeneity of the coating in the strip width.

According to another variant, the heating device 3 comprises sequentially along the path of the moving strip a base heater covering the full width of path P and the plurality of infrared heaters described above. The base heater can be an infrared heater or an inductor. Thanks to this design, a part of the energy needed to reach the correct temperature of the wet film at the exit of the heating device is provided by the base heater. Each infrared heater of the plurality of infrared heaters independently provides the remaining part of the energy and can adjust it as requested.

The heating device 3 is preferably positioned above the path P so that the wet film applied on the top side of the strip is directly heated. The heating device can also be positioned above and below the path P to minimize thermal gradients.

The coil-coating line 1 further comprises an Ultra-Violet (UV) curing device 4. The purpose of this equipment is to cure the surface of the wet film of radcure paint. It has been observed that this surface curing generates a very fine texturing at the film surface which, combined with mating agents and possible other charges, contribute to the gloss of the organic coating once the wet film has been fully cured by Electron-Beam.

According to one variant, the UV curing device 4 covers the full width of the path P of the moving strip. In that case, the surface of the wet film is cured uniformly along the strip width when exposed to UV.

According to another variant, the UV curing device 4 comprises a plurality of UV modules distributed in the width of the path P. In other words, the plurality of UV modules forms a row substantially parallel to the width of the path P, i.e. perpendicular to the moving direction of the strip. For the sake of clarity, the UV modules described here are independent from each other and positioned adjacent to each other but they can be physically inseparable from each other. They can be individually-controllable portions of a single UV curing device.

Thanks to this design, different width portions of the path/strip can be exposed to different UV doses. It helps correcting and minimizing gloss variations in the strip width.

UVA and UVB are preferred. UVA is long-range UV radiation between 320 and 400 nm. UVB is short-wave UV radiation between 280 and 320 nm. They can be obtained with conventional arc UV lamps.

The UV curing device 4 is preferably movable along the path P of the moving strip. It allows the length between the UV curing device and the EB curing device to be adjusted, i.e. extended or shortened. It has indeed been observed that the wrinkles or surface roughness initiated during the UV curing is further developed during the time interval between UV curing and EB curing, which impacts the gloss of the organic coating.

In the case of a plurality of UV modules, each UV module is preferably movable along the path P independently from the others.

The coil-coating line 1 further comprises an Electron-Beam curing device 5. The purpose of this equipment is to cure the wet film of radcure paint, i.e. in its full thickness. It further freezes the surface roughness which appears at the surface of the wet film during UV curing and which further develops during the time interval between UV curing and EB curing. The EB device is generally operated in the following conditions: 100-200 kV, 20-50 kGy, inerting with nitrogen below 200 ppm $O_2$.

The coil-coating line 1 further comprises a wet film temperature measuring device 6 positioned downstream of the heating device 3 and upstream of the UV curing device 4. This wet film temperature measuring device measures the temperature of the wet film before it enters the UV curing device. It can measure the temperature of the wet film along the whole width of the path P of the moving strip or it can measure the temperature on only a portion of the width. Examples of wet film temperature measuring devices are pyrometer, thermal camera, thermocouple. The measured temperature can be expressed in ° C., OF or K.

In the case where the wet film temperature measuring device measures the temperature on only a portion of the width, the measure on this portion can be considered relevant enough to manage the gloss of the whole strip width.

Alternatively, a plurality of wet film temperature measuring devices is positioned downstream of the heating device 3 and upstream of the UV curing device so that the whole width of the path P of the moving strip is covered. They form a row substantially parallel to the width of the path P. Accordingly, the heating device preferably comprises a plurality of infrared heaters forming a row substantially parallel to the width of the path P, each infrared heater been suited for heating a width portion of the strip whose temperature is then measured by one wet film temperature measuring device.

In order to further increase the temperature control of the wet film in the UV curing device, the wet film temperature measuring device 6 and the UV curing device 4 are not separated by more than 2 meters, preferably not by more than 1 meter, or the temperature of the wet film is not measured more than 4 seconds before the wet film is cured in the UV curing device, preferably not more than 2 seconds. Alternatively or in addition, the portion of the path P of the moving strip between the wet film temperature measuring device and the UV curing device can be thermally insulated to keep the wet film at the measured temperature before it is cured in the UV curing device.

The coil-coating line 1 further comprises a gloss measuring device 7 positioned downstream of the Electron-Beam curing device 5. This gloss measuring device measures the gloss of the organic coating after EB curing. It can measure the gloss of the organic coating along the whole width of the path P of the moving strip or it can measure the gloss on only a portion of the width. Examples of gloss measuring devices are glossmeters. The measured gloss is preferably expressed in GU (Gloss Units). The gloss is preferably measured in accordance with standards ISO 2813:2014 and EN 13523-2:2021. Preferably, the gloss is measured with a 20° geometry, a 60° geometry or a 85° geometry, i.e. the reflection angle is either 20°, 60° or 85°. More preferably, the gloss is measured with a 60° geometry.

In the case where the gloss measuring device measures the gloss on only a portion of the width, the measure on this portion can be considered relevant enough to manage the gloss of the whole strip width.

Alternatively, a plurality of gloss measuring devices is positioned downstream of the EB curing device so that the whole width of the path P of the moving strip is covered. They form a row substantially parallel to the width of the path P. Accordingly, the heating device preferably comprises a plurality of infrared heaters forming a row substantially parallel to the width of the path P, each infrared heater been suited for heating a width portion of the strip whose gloss is then measured by one gloss measuring device.

The coil-coating line 1 is preferably equipped with a strip speed measuring device, more preferably positioned at the level of a guiding roll. An example of strip speed measuring device is a tachymeter integrated on roll axis.

The coil-coating line 1 can further comprise an inductor 8 upstream of the paint applicator 2. It can heat the strip before it reaches the paint applicator. Having a warm strip in the paint applicator favors the paint application. Furthermore, the temperature reached by the strip in the inductor can be adjusted to correct possible gloss deviations, as it will be described in details later.

The coil-coating line 1 can further comprise an entry section with an uncoiler 9 to uncoil the strip to be coated on the line. The uncoiler can be combined with a welding machine or a stitching machine so that the front end of the strip to be coated can be attached to the tail end of the previous strip.

Alternatively, the coil-coating line can be coupled to a galvanizing line so that the strip coated with the metallic alloys contained in the bath of the galvanizing line is directed coated with the organic coating without having to first coil it and then uncoil it.

The coil-coating line 1 can further comprise an entry accumulator 10 located in the entry section of the line, downstream of the uncoiler if applicable. The accumulator is a piece of equipment that “accumulates” a certain amount of strip. It is a set of upper and lower banks of rolls through which the metal strip is threaded in a serpentine fashion, and it stores lengths of metal as the two roll banks are spread apart. The total stored length of metal depends on the design speed of the line, usually 60 seconds of steady-state metal processing time. When the entry section of the coil-coating line stops, the roll banks move toward each other, and the stored metal in the accumulator continues to feed the rest of the coil-coating line.

The coil-coating line 1 can further comprise a cleaning section 11, positioned downstream of the entry section, in particular downstream of the entry accumulator if applicable. In this section, the strip is subjected to a surface preparation step. This type of preparation comprises at least one step selected among rinsing, degreasing and a conversion treatment. The purpose of the rinsing is to eliminate the loose particles of dirt, potential residues of conversion solutions, soaps that may have formed and to achieve a clean and reactive surface. The purpose of the degreasing is to clean the surface by removing all traces of organic dirt, metallic particles and dust from the surface. Preferably, the degreasing is performed in an alkaline environment. The conversion treatment includes the application on the strip of a conversion solution that reacts chemically with the surface and thereby makes it possible to form a conversion layer. The latter increases the adherence of the paint and the corrosion resistance. The conversion treatment is preferably an acid solution that does not contain chromium. More preferably, the conversion treatment is based on hexafluorotitanic acid or hexafluorozirconic acid.

The coil-coating line 1 can further comprise a primer section, upstream of the paint roll-coater and downstream of the cleaning section if applicable. In this section, a first layer of paint can be applied on the strip to form a primer coating. The primer section can comprise a primer paint applicator and a curing equipment. Depending on the nature of the primer, the curing equipment can be an oven, such as a convection oven, an infra-red (or near infra-red) oven or an induction oven, a UV curing device and/or an EB curing device.

The coil-coating line 1 can further comprise an exit accumulator 12 located in the exit section of the line, downstream of the EB curing device. The exit accumulator is similar to the entry accumulator described above.

The coil-coating line 1 can further comprise a recoiler 13 to recoil the strip which has been coated on the line. The recoiler can be combined with a cut-off to separate the strip from the next one processed on the line.

The invention also relates to a gloss management tool for managing the gloss of an organic coating formed by application and curing of a wet film of a radcure paint on a moving strip on a coil-coating line 1 comprising, sequentially along the path P of the moving strip S, a paint applicator 2, a heating device 3 comprising an infrared heater, an Ultra-Violet curing device 4 and an Electron-Beam curing device 5.

The gloss management tool comprises a setting module for setting a set gloss value $G_s$ of the organic coating, a set gloss range $R_s$ of the gloss of the organic coating and a proportionality constant K of a predefined linear mathematical relation between the temperature of the wet film before Ultra-Violet curing and the gloss of the organic coating after Electron-Beam curing.

The gloss management tool further comprises an acquisition module configured for collecting the measure of the temperature T of the wet film in at least a width portion of the moving strip downstream of the infrared heater and upstream of the Ultra-Violet curing device and for collecting the measure of the gloss G of the organic coating in the at least a width portion downstream of the Electron-Beam curing device.

The gloss management tool further comprises a correction module configured for correcting a deviation of the measured gloss G beyond the set gloss range $R_s$, the correction comprising calculating the corrected temperature $T_c$ to be reached by the wet film in the at least a width portion downstream of the infrared heater and upstream of the Ultra-Violet curing device according to equation 1:

$$T_c = T + K(G - G_s) \quad (1)$$

The gloss management tool can include a processing unit formed for example of a memory and of a processor coupled to the memory. The electronic monitoring device may also include a display screen and input/output means, such as a keyboard and a mouse, each being connected to the processing unit. Each of the setting module, acquisition module and correction module can be implemented, as a software executable by the processor.

The coil-coating line is preferably equipped with the gloss management tool to ease the management of the gloss on the coil-coating line.

From a process perspective, the management of the gloss of an organic coating formed by application and curing of a wet film of a radcure paint on a moving strip on the coil-coating described above is primarily based on the discovery that the temperature of the wet film before UV curing is key. In particular, the inventors have observed that, in dualcure for coil-coating, there is a linear relationship between the temperature of the wet film before UV curing and the gloss of the organic coating after EB curing. Consequently, any deviation of the gloss after EB curing can be efficiently and reproducibly corrected by adjusting the temperature of the wet film before UV curing.

The method is applied on a moving strip. The strip can be one single coil which is unwounded at the entry of the coil-coating line. More generally, the strip is composed of different coils attached to one another end to end. The coils form one essentially continuous strip whose features and technical specifications to be reached at the exit of the coil-coating line vary over time. The strip is moved along the path P of the coil-coating line so that the wet film of radcure paint is applied, preferably heated, and double cured. In particular, the strip is moved along the path P of the coil-coating line so that the wet film of radcure paint is first applied on the strip by the paint applicator, then heated by the infrared heater, then exposed to UV in the Ultra-Violet curing device and finally cured in the Electron-Beam device. Optionally, the strip can be preheated with an inductor 8 positioned upstream of the paint applicator 2. Optionally, the radcure paint can be heated in the paint applicator.

A first embodiment of the method is described with reference to FIG. 2.

The first step 100 of the method for managing the gloss is the setting of some set values needed for a correct regulation.

The set gloss value $G_s$ of the organic coating is first set. This value corresponds to the gloss requested by the customer or by the operator of the coil-coating line. From a practical point of view, it can be manually entered in the gloss management tool, in particular in the setting module. Alternatively, it can be automatically obtained from the order book of the coil-coating line, in particular from the scheduling tool.

As slight deviations of the gloss along the length of the strip are usually acceptable from a quality perspective, a set gloss range $R_s$ of the gloss of the organic coating is also set. It can be entered as a range as such, with a minimal gloss and a maximal gloss or it can be entered as a standard deviation of the set gloss value $G_s$. Of course, if for some reason, slight deviations have to be avoided, the set gloss value $G_s$ can be entered as the minimal gloss and the maximal gloss or the standard deviation can be set at zero. From a practical point of view, the set gloss range $R_s$ can be manually entered in the gloss management tool, in particular in the setting module. Alternatively, it can be automatically obtained from the management tool of the coil-coating line or from the order book of the coil-coating line, in particular from the scheduling tool. The set gloss range $R_s$ of the gloss can also be obtained from standards, such as EN10169: 2013.

Also, as the gloss management relies on the linear mathematical relation between the temperature of the wet film before Ultra-Violet curing and the gloss of the organic coating after Electron-Beam curing, the proportionality constant K of this linear mathematical relation has to be set so that the regulation is correct.

The proportionality constant K can be obtained in a calibration step performed ahead of the setting step. During this calibration step, wet films of the radcure paint to be used on the coil-coating line are heated at different temperatures, cured by dualcure in standard curing conditions and the gloss of the organic coatings is measured. The proportionality constant K can thus be deducted. It is preferably expressed in ° C./GU, ° F./GU or K/GU, depending on the temperature unit. This calibration step can be done once and for all and does not have to be performed each time the method according to the invention is implemented.

From a practical point of view, the proportionality constant K is obtained from a predefined linear mathematical relation between the temperature of the wet film before Ultra-Violet curing and the gloss of the organic coating after Electron-Beam curing, the predefined linear mathematical relation being available to the operator of the coil-coating line. By "predefined", it is meant that a calibration step, preferably as described above, has been performed before implementing the method on the coil-coating line. The proportionality constant K can be manually entered in the gloss management tool, in particular in the setting module. Alternatively, it can be automatically obtained by crossing the predefined linear mathematical relations entered in the gloss management tool, possibly in the form of a table, with the paint reference from the order book of the coil-coating line, in particular from the scheduling tool.

For example, it has been observed that for radcure paints commercially available for coil-coating of steel, K is usually comprised between 0.3 and 1.2.

In a second step 120 of the method for managing the gloss, the measure of the temperature T of the wet film in at least a width portion of the moving strip downstream of the infrared heater and upstream of the Ultra-Violet curing device is collected and the measure of the gloss G of the organic coating in the at least a width portion downstream of the Electron-Beam curing device is collected.

Preferably, the temperature is measured with a wet film temperature measuring device as described above and the gloss is measured with a gloss measuring device as described above.

Preferably, both measures are done at time intervals short enough to have a proper management of the gloss. Examples of time intervals are less than 30 s, less than 20 s, less than every 10 s, less than every 5 s, less than every 2 s, less than every second. More preferably, both measures are substantially continuous or continuous. Preferably, both measures are collected at time intervals short enough to have a proper management of the gloss. Examples of time intervals are less than every 10 s, less than every 5 s, less than every 2 s, less than every second. More preferably, both measures are collected substantially continuously or continuously. Preferably, the measurements are collected in the gloss management tool, in particular in the acquisition module, more preferably automatically with the appropriate interface.

By "width portion", it is meant that the moving strip is conceptually divided in portions adjacent to one another in the strip width. There can be one single width portion or a plurality. Consequently, the wet film and the organic coating can also be conceptually divided in the same width portions. By "at least a width portion", it is meant that the method is implemented either on one width portion or on a plurality of width portions or on the full width of the moving strip. In the case where it is not implemented on the full width, it is thus possible to measure and collect:

- the temperature T of the wet film in one single width portion if the measure in this width portion is considered representative enough of the mean temperature over the whole strip width or, the temperatures of the wet film in a plurality of width portions so that the temperature in each width portion can be adjusted independently to the other portions.

Similarly, it is thus possible to measure and collect:

the gloss G of the organic coating in one single width portion if the measure in this width portion is considered relevant enough to manage the gloss of the whole strip width or, the glosses of the organic coating in a plurality of width portions so that the gloss in each width portion can be managed independently to the other portions. Details on the way the gloss is managed in that case is provided later, with reference to FIG. 5.

In one variant, the collecting step is performed after the setting step.

In another variant, in particular during a continuous operation of the coil-coating line, the collecting step can be done in parallel to the setting step. In such case of continuous operation, as the strip is composed of different coils attached to one another end to end, changes in the features of the strip and changes in the technical specifications of the strip often happen. While the collecting step is in progress, any one of the set parameters, in particular any one of the set gloss value $G_s$, the set gloss range $R_s$ and/or the constant K, may have to be modified for some reason, like a change of specified gloss or a change in radcure paint. Consequently, the setting step is performed.

In a third step 130 of the method for managing the gloss, a possible deviation of the measured gloss G beyond the set gloss range $R_s$ is corrected. At first, a possible deviation of the gloss is assessed by comparing the measured gloss G to the set gloss value $G_s$ and/or to the set gloss range $R_s$. If the measured gloss G is still within the set gloss range $R_s$, the settings are maintained. If the measured gloss G has deviated beyond the set gloss range $R_s$, the corrected temperature $T_c$ to be reached by the wet film in the at least a width portion of the moving strip downstream of the infrared heater and upstream of the Ultra-Violet curing device is calculated according to equation 1:

$$T_c = T + K(G - G_s) \tag{1}$$

The assessment of the gloss deviation can be done at any time. Preferably, it is done at time intervals short enough to have a proper management of the gloss. Examples of time intervals are less than 30 s, less than 20 s, less than every 10 s, less than every 5 s, less than every 2 s, less than every second. More preferably, the assessment is substantially continuous or continuous.

Once the corrected temperature has been calculated, the result of the calculation, i.e. corrected temperature $T_c$, is preferably made available to a line operator. The latter can make the necessary corrections.

Generally speaking, a line setting is adjusted taking into account the calculated corrected temperature $T_c$, so that the gloss of value $G_s$ is obtained on the organic coating in the at least a width portion of the moving strip downstream of the Electron-Beam curing device. In particular, a line setting is adjusted so that the wet film reaches the corrected temperature $T_c$ in the at least a width portion of the moving strip downstream of the infrared heater and upstream of the Ultra-Violet curing device.

Figure 2:
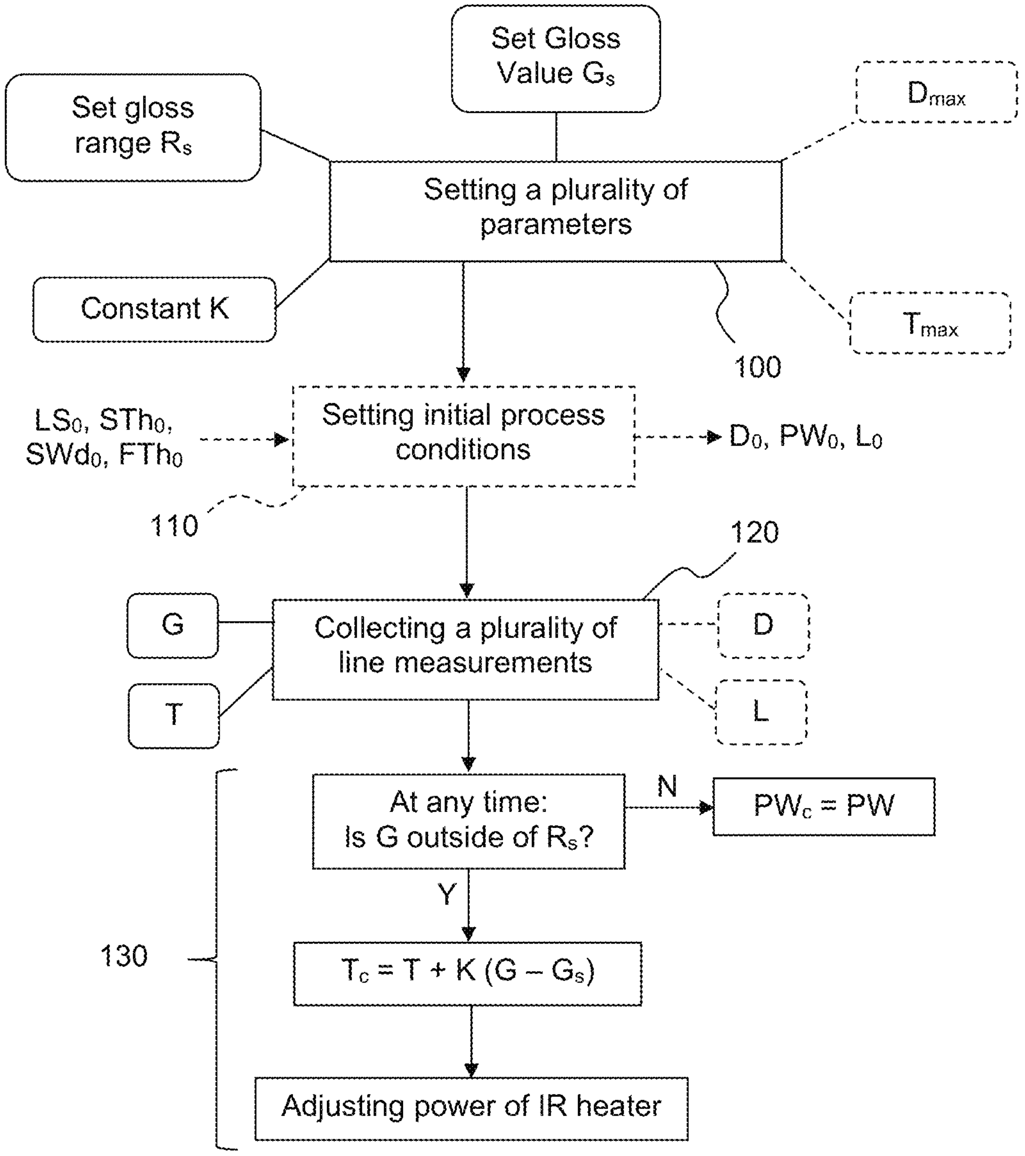
FIG. 2, which is a flowchart of a first embodiment of the method according to the invention, FIG. 3, which is a flowchart of a second embodiment of the method according to the invention, FIG. 4, which is a flowchart of a third embodiment of the method according to the invention, FIG. 5, which is a flowchart of a fourth embodiment of the method according to the invention.

In a first variant illustrated on FIG. 2, once the corrected temperature has been calculated, the power of the infrared heater is adjusted so that the wet film reaches the corrected temperature $T_c$ in the at least a width portion of the moving strip downstream of the infrared heater and upstream of the Ultra-Violet curing device. Adjusting the power of the infrared heater includes turning the infrared heater on or off. Thanks to the adjustment of the infrared heater, the temperature of the wet film in the width portion downstream of the infrared heater and upstream of the Ultra-Violet curing device is corrected and gloss of value $G_s$ is obtained on the organic coating in the width portion downstream of the Electron-Beam curing device. The adjustment of the power of the infrared heater can be done either manually by an operator or automatically with the help of the gloss management tool, in particular of the correction module.

Alternatively, in the case where the coil-coating line is equipped with an inductor upstream of the paint applicator, once the corrected temperature has been calculated, the power of the inductor is adjusted so that the temperature of the strip at the level of the paint applicator is adjusted so that the wet film reaches the corrected temperature $T_c$ in the at least a width portion of the moving strip downstream of the infrared heater and upstream of the Ultra-Violet curing device. This alternative way of correcting the gloss is helpful notably in the case where the infrared heater is already at maximum capacity and the temperature of the wet film upstream of the Ultra-Violet curing device has to be further increased. By further heating the strip in the inductor, the overheating to be provided by the infrared heater is decreased.

In one variant, the correcting step 130 is performed after the collecting step 120.

In another variant, in particular during a continuous operation of the coil-coating line, the correcting step can be done in parallel to the collecting step. In such case of continuous operation, as the strip is composed of different coils attached to one another end to end, changes in the features of the strip and changes in the technical specifications of the strip often happen. They can make the gloss deviate. While the collecting step is in progress, the correcting step is performed to correct the measured gloss.

Optionally, the method further comprises a step 110 during which initial line conditions are set. This step is referred to as the initial line setting step. As explained above, the method is such that any deviation of the measured gloss beyond the set gloss range $R_s$ is corrected. That said, at the start of a production campaign on the coil-coating line or after an important change in, for example, the strip format, the paint thickness, the paint color or the line speed, the line conditions might be shifted from the line conditions appropriate for reaching the set gloss value $G_s$. In such case, the infrared heater may not heat appropriately and/or may need some time to reach the power corresponding to the corrected temperature $T_c$. Consequently, a portion of the coated strip may have to be scrapped because the gloss is out of the specifications. Moreover, the UV dose to which the wet film must be exposed to initiate the surface roughness that will bring the set gloss value may not be appropriate. In such case, the infrared heater needs to compensate for the shifted UV dose, possibly by heating strongly, which takes time. Here again, a portion of the coated strip may have to be scrapped because the gloss is out of the specifications. In order to minimize the length of coated strip out of specifications, it is advantageous to set initial line conditions.

To do so, in a first sub-step, a plurality of process parameters and/or of specifications of the coated strip are collected. An example of process parameters is the initial line speed $LS_0$. It is preferably the one recommended for the next coil to be coated on the coil-coating line. Another example is the initial thickness $FTh_0$ of the wet film applied on the strip by the paint applicator. The initial film thickness is preferably the one that corresponds to the organic coating thickness specified for the next coil to be coated on the coil-coating line. Another example is the temperature of the moving strip before the paint applicator, preferably before the inductor. Examples of specifications are the initial strip thickness $STh_0$, the initial strip width $SWd_0$, the paint color. Preferably, the initial line speed $LS_0$, initial thickness $FTh_0$, the initial strip thickness $STh_0$, the initial strip width $SWd_0$ and the paint color are collected. From a practical point of view, process parameters and/or specifications can be manually entered in the gloss management tool, in particular in the setting module. Alternatively, they can be automatically obtained from the order book of the coil-coating line, in particular from the scheduling tool and/or deducted from the order book. For example, the initial film thickness $FTh_0$ can be deducted from the organic coating thickness specified in the order book.

Once process parameters and/or specifications have been collected, in a second sub-step, the initial line conditions are set taking into account the process parameters and/or specifications that have been collected. In particular, they are calculated from the process parameters and/or specifications that have been collected. The following initial line conditions can be set:

- the initial power $PW_0$ of the infrared heater,
- the initial UV dose $D_0$ of the Ultra-Violet curing device, or of the UV module if applicable,
- the initial length $L_0$ between the Ultra-Violet curing device, or the UV module if applicable, and the Electron-Beam curing device.

The initial power $PW_0$ can be set knowing the mass flow of the moving strip, the specific heat capacity of the strip and the infrared yield. The initial UV dose $D_0$ can set based on data obtained in a calibration step performed ahead of the initial line setting step. The initial length $L_0$ can be set based on data obtained in a calibration step performed ahead of the initial line setting step.

From a practical point of view, the initial line conditions can be manually entered in the management tool of the coil-coating line. Alternatively, they can be automatically injected by the gloss management tool in the management tool of the coil-coating line.

In one variant, the initial line setting step 110 is performed before the setting step 100. It helps starting the production with line conditions that are already optimized for the first coil of the production campaign, in addition to an initial combination of set gloss value $G_s$, set gloss range $R_s$ and constant K. During production, the collecting step and the correcting step can be performed to manage the gloss. When any one of the set parameters, in particular any one of the set gloss value $G_s$, the set gloss range $R_s$ and/or the constant K, has to be modified for some reason, like a change of specified gloss or a change in radcure paint, then it is relied on the performance of the collecting step 120 and the correcting step 130 to keep the measured gloss within the set gloss range $R_s$.

In another variant, the initial line setting step 110 is performed after the setting step 100, as illustrated on FIG. 2. This way the setting of the initial line conditions can be done by taking the set gloss value $G_s$ into account. The line conditions are thus better optimized for the first coil of the production campaign. Moreover, during production, when any one of the set parameters, in particular any one of the set gloss value $G_s$, the set gloss range $R_s$ and/or the constant K has to be modified for some reason, the initial line settings can be reset to help minimizing the transitional period.

In another variant, the initial line setting step 110 is performed before and after the setting step 100 to take advantages of both variants described above.

In another variant, in particular during a continuous operation of the coil-coating line, the initial line setting step can be done in parallel to the collecting step. In such case of continuous operation, as the strip is composed of different coils attached to one another end to end, changes in the features of the strip and changes in the technical specifications of the strip often happen. Re-initializing the line conditions when one of these changes occurs helps to reach the set gloss value as fast as possible.

A second embodiment of the method is now described with reference to FIG. 3.

This embodiment mainly differs from the first one in that the correcting step comprises additional sub-steps to:

- ensure that the calculated corrected temperature $T_c$ does not exceed a maximum temperature $T_{max}$ that would degrade the radcure paint and,
- correct the deviation of the measured gloss G accordingly.

Thanks to this configuration, the method further prevents the thermal degradation of the wet film when heated in the infrared heater.

The details provided when describing the first embodiment apply for the second embodiment. The additional steps and corresponding features are described in detail now.

The setting step 100 further comprises setting a maximum temperature $T_{max}$ for the radcure paint. This temperature can be the one recommended by the paint supplier. It can alternatively be identified by the operator of the coil-coating line, notably by measuring emanations of paint monomers as a function of the temperature, this measure being done off line or possibly on line at the level of the infrared heater. From a practical point of view, the maximum temperature $T_{max}$ can be manually entered in the gloss management tool, in particular in the setting module. Alternatively, it can be automatically obtained by crossing the different maximum temperatures entered in the gloss management tool with the paint reference from the order book of the coil-coating line, in particular from the scheduling tool.

The collecting step 120 further comprises collecting the UV dose D of the UV module. The power of the UV module is generally known from the operator, possibly from the management tool of the coil-coating line, but, for a given power, the actual UV dose to which the wet film is exposed varies with the line speed LS. Accordingly, the UV dose is calculated based on the power of the UV module and the line speed and collected. The line speed itself is generally known from the operator, possibly from the management tool of the coil-coating line.

Preferably the UV dose is re-calculated and collected each time either the power of the UV module and/or the line speed is adjusted. More preferably, the collection of the UV dose is substantially continuous. Preferably, the UV dose is collected in the gloss management tool, in particular in the acquisition module, more preferably automatically with the appropriate interface.

During the correcting step 130, once the corrected temperature $T_c$ has been calculated, it is compared to the maximum temperature $T_{max}$. If $T_c$ is inferior to $T_{max}$, then the power of the infrared heater is adjusted so that the wet film reaches the corrected temperature $T_c$ in the at least a width portion of the moving strip downstream of the infrared heater and upstream of the Ultra-Violet curing device, as in the first embodiment. Alternatively, in the case where the coil-coating line is equipped with an inductor upstream of the paint applicator, once the corrected temperature has been calculated, the power of the inductor is adjusted so that the temperature of the strip at the level of the paint applicator is adjusted so that the wet film reaches the corrected temperature $T_c$ in the at least a width portion of the moving strip downstream of the infrared heater and upstream of the Ultra-Violet curing device.

If $T_c$ is superior to $T_{max}$, then the gloss has to be corrected without increasing the power of the infrared heater or the power of the inductor any further. One way to do so is to adjust the power of the UV module. It has indeed been observed that it impacts the gloss of the organic coating. The more the UV dose on the wet film increases, the more the gloss decreases. Consequently, the correcting step 130 further comprises calculating the corrected UV dose $D_c$ to which the wet film in the at least a width portion of the moving strip must be exposed in the UV module according to equation 2:

$$D_c = f_1(D, G, G_s) \quad (2)$$

Equation (2) can be obtained in a calibration step performed ahead of the correcting step, preferably ahead of the setting step. During this calibration step, wet films of the radcure paint to be used on the coil-coating line are exposed to different UV doses, cured by EB in standard curing conditions and the gloss of the organic coating is measured. Function $f_1$ can thus be deducted for each radcure paint. This calibration step can be done once and for all and does not have to be performed each time the method according to the invention is implemented.

Preferably, function $f_1$ of the predefined mathematical relation between the UV dose to which the wet film of radcure paint is exposed and the gloss of the organic coating after Electron-Beam curing is set during the setting step. By "predefined", it is meant that a calibration step, preferably as described above, has been performed before implementing the method on the coil-coating line. The function $f_1$ can be manually entered in the gloss management tool, in particular in the setting module. Alternatively, it can be automatically obtained by crossing the predefined mathematical relations entered in the gloss management tool with the paint reference from the order book of the coil-coating line, in particular from the scheduling tool.

For example, it has been observed that for radcure paints commercially available for coil-coating of steel, $f_1$ is usually related to a gloss curve decreasing towards an asymptote as the UV dose increases.

Once the corrected UV dose has been calculated, the result of the calculation, i.e. corrected UV dose $D_c$, is preferably made available to a line operator. The latter can make the necessary corrections.

Generally speaking, a line setting other than the power of the infrared heater, and than the power of the inductor if applicable, is adjusted taking into account the calculated corrected UV dose $D_c$, so that the gloss of value $G_s$ is obtained on the organic coating in the at least a width portion of the moving strip downstream of the Electron-Beam curing device.

Figure 3:
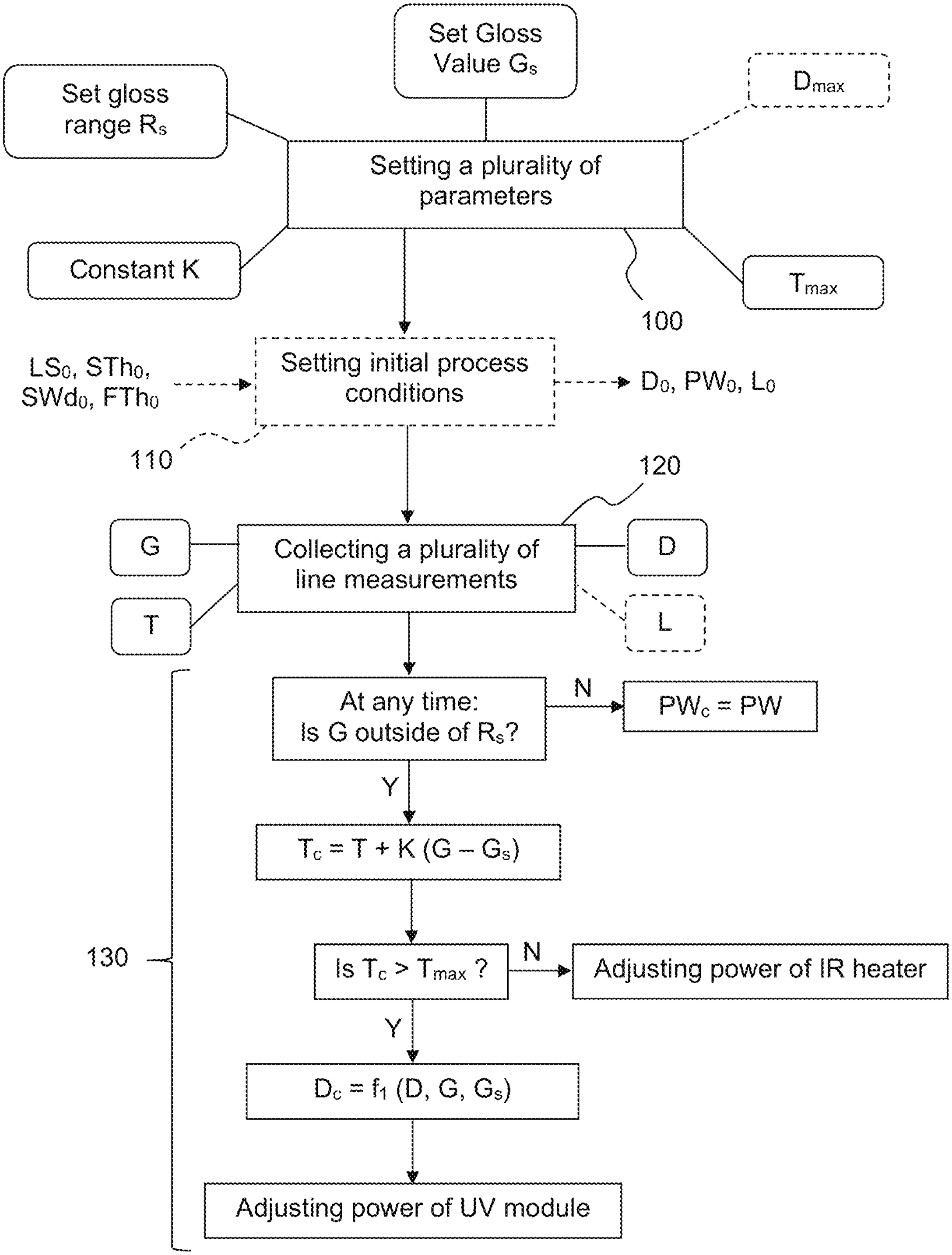

In the variant illustrated on FIG. 3, once the corrected UV dose has been calculated, the power of the UV module is adjusted so that the wet film in the at least a width portion of the moving strip is exposed to the UV dose $D_c$ in the UV module. Thanks to the adjustment of the UV module, the UV dose to which the wet film is exposed in the width portion in the UV module is corrected and gloss of value $G_s$ is obtained on the organic coating in the width portion downstream of the Electron-Beam curing device. The adjustment of the power of the UV module can be done either manually by an operator or automatically with the help of the gloss management tool.

A third embodiment of the method is now described with reference to FIG. 4.

This embodiment mainly differs from the second one in that the correcting step comprises additional sub-steps to:

- ensure that the calculated corrected UV dose $D_c$ does not exceed a maximum UV dose $D_{max}$ to which the wet film can be exposed,
- correct the deviation of the measured gloss G accordingly.

Thanks to this configuration, the method further prevents the overcuring of the wet film in the UV curing device, which might impact detrimentally the gloss.

The details provided when describing the first and second embodiments apply for the third embodiment. The additional steps and corresponding features are described in detail now.

In this embodiment, the UV module of the Ultra-Violet curing device of the coil-coating line is movable along the path P. Accordingly the length L between the UV module and the Electron-Beam curing device can be adjusted.

The setting step 100 further comprises setting a maximum UV dose $D_{max}$ to which the wet film can be exposed in the UV module. This UV dose can be the one recommended by the paint supplier. It can alternatively be identified by the operator of the coil-coating line notably during a calibration step. From a practical point of view, the maximum UV dose $D_{max}$ can be manually entered in the gloss management tool, in particular in the setting module. Alternatively, it can be automatically obtained by crossing the different maximum UV doses entered in the gloss management tool with the paint reference from the order book of the coil-coating line, in particular from the scheduling tool.

The collecting step 120 further comprises collecting the length L between the UV module and the Electron-Beam curing device. This length is generally known from the operator, possibly from the management tool of the coil-coating line. It can be collected manually. Preferably it is collected in the gloss management tool, more preferably automatically with the appropriate interface. Preferably, it is collected only when the length L is modified.

During the correcting step 130, once the corrected UV dose $D_c$ has been calculated, it is compared to the maximum UV dose $D_{max}$. If $D_c$ is inferior to $D_{max}$, then the power/setting of the UV module is adjusted so that the wet film in the at least a width portion of the moving strip is exposed to the UV dose $D_c$ in the UV module. Thanks to the adjustment of the UV module, the UV dose to which the wet film is exposed in the width portion in the UV module is corrected and a gloss of value $G_s$ is obtained on the organic coating in the width portion downstream of the Electron-Beam curing device, as in the second embodiment.

If $D_c$ is superior to $D_{max}$, then the gloss has to be corrected without increasing the UV dose of the UV module any further. One way to do so is to adjust the length between the UV module and the Electron-Beam curing device. It has indeed been observed that it impacts the gloss of the organic coating. The longer the time between the UV curing and the EB curing, the lower the gloss. Consequently, the correcting step 130 further comprises calculating the corrected length $L_c$ between the UV module and the Electron-Beam curing device according to equation 3:

$$L_c = f_2(L, G, G_s) \quad (3)$$

Equation (3) can be obtained in a calibration step performed ahead of the correcting step, preferably ahead of the setting step. During this calibration step, wet films of the radcure paint to be used on the coil-coating line are exposed sequentially to UV curing and EB curing in standard curing conditions with varying time between the two curings and the gloss of the organic coating is measured. Function $f_2$ can thus be deducted for each radcure paint. This calibration step can be done once and for all and does not have to be performed each time the method according to the invention is implemented.

Preferably, function $f_2$ of the predefined mathematical relation between the length between the UV module and the Electron-Beam curing device and the gloss of the organic coating after Electron-Beam curing is set during the setting step. By "predefined", it is meant that a calibration step, preferably as described above, has been performed before implementing the method on the coil-coating line. The function $f_2$ can be manually entered in the gloss management tool, in particular in the setting module. Alternatively, it can be automatically obtained by crossing the predefined mathematical relations entered in the gloss management tool with the paint reference from the order book of the coil-coating line, in particular from the scheduling tool.

For example, it has been observed that for radcure paints commercially available for coil-coating of steel, $f_2$ is usually related to a gloss curve decreasing towards an asymptote as L increases.

Once the corrected length has been calculated, the result of the calculation, i.e. corrected length $L_c$, is preferably made available to a line operator. The latter can make the necessary corrections.

Generally speaking, a line setting other than the power of the infrared heater, than the power of the inductor if applicable, and than the power of the UV module is adjusted taking into account the calculated corrected length $L_c$, so that the gloss of value $G_s$ is obtained on the organic coating in the at least a width portion of the moving strip downstream of the Electron-Beam curing device.

Figure 4:
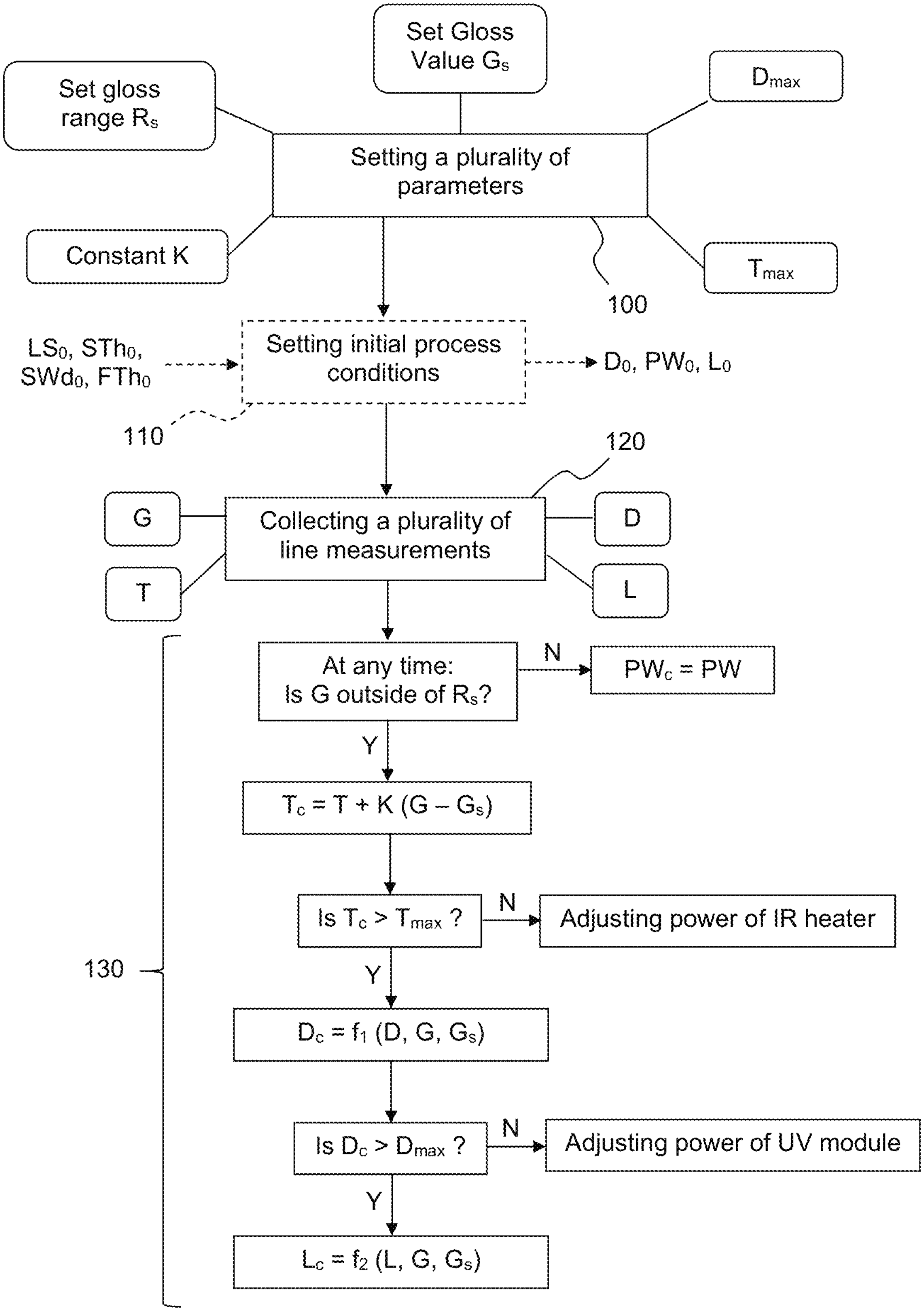

In the variant illustrated on FIG. 4, once the corrected length has been calculated, the length between the UV module and the Electron-Beam curing device is adjusted so that the gloss of value $G_s$ is obtained on the organic coating in the at least a width portion of the moving strip downstream of the Electron-Beam curing device. The adjustment of the length can be done either manually by an operator or automatically with the help of the gloss management tool.

Alternatively, notably if the length between the UV module and the Electron-Beam curing device cannot be further extended or shortened, the line speed can be adjusted. In that case, the initial line setting is performed again to adjust to the new line speed, the initial power $PW_0$ of the infrared heater, the initial UV dose $D_0$ of the Ultra-Violet curing device and the initial length $L_0$ between the Ultra-Violet curing device and the Electron-Beam curing device.

A fourth embodiment of the method is now described with reference to FIG. 5. This embodiment mainly differs from the first, second and third embodiments in that the gloss is managed on each width portion of the moving strip independently from the other portions. Thanks to this configuration, temperature deviations along the width of the strip, which result in gloss deviations along the width, can be reduced by adjusting the power of each infrared heater of the heating device independently from the other infrared heaters. The details provided when describing the first, second and third embodiments apply for the fourth embodiment. The differences are described in detail now.

To implement the fourth embodiment of the method, the coil-coating line further comprises (compared to the coil-coating line used to implement the first embodiment of the method) a heating device 3 comprising a plurality of infrared heaters, identified below as IR, IR', IR" . . . $IR^i$ forming a row substantially parallel to the width of the path P.

In that case, the second step 120 comprises collecting the measures of the temperatures of the wet film in a plurality of width portions downstream of the infrared heaters and upstream of the Ultra-Violet curing device. In that case, each width portion P, P', P" . . . $P^i$ of the moving strip downstream of the infrared heaters and upstream of the Ultra-Violet curing device is assigned, at each time t, one measurement value T, T', T" . . . $T^i$. This assignment can be done thanks to a plurality of wet film temperature measuring devices. It can also be done thanks to a single wet film temperature measuring device capable of measuring the temperature of the wet film in its full width, such as a thermal camera for example.

Similarly, the second step comprises collecting the measures of the glosses of the organic coating in a plurality of width portions downstream of the EB curing device. In that case, each portion P, P', P" . . . $P^i$ of the moving strip downstream of the EB curing device is assigned, at each time t, one measurement value G, G', G" . . . $G^i$. This assignment can be done thanks to a plurality of gloss measuring devices. It can also be done thanks to a single gloss measuring device capable of measuring the gloss of the organic coating in its full width, for example an oscillating glossmeter.

In this embodiment, the correcting step 130 comprises correcting a possible deviation of the measured glosses beyond the set gloss range $R_s$, on each width portion independently from the others. At first, a possible deviation of the glosses is assessed by comparing the measured glosses G, G', G" . . . $G^i$ to the set gloss value $G_s$ and/or to the set gloss range $R_s$. For any width portion $P^i$, independently from the other portions, if the measured gloss $G^i$ is still within the set gloss range $R_s$, the setting of infrared heater $IR^i$ is maintained. If the measured gloss $G^i$ has deviated beyond the set gloss range $R_s$, the corrected temperature $$T_c^i$$

to be reached by the wet film in the width portion $P^i$ downstream of infrared heater $IR^i$ and upstream of the Ultra-Violet curing device is calculated according to equation $1^i$:

$$T_c^i = T^i - K(G^i - G_s) \qquad (1^i)$$

For any width portion $P^i$, in correcting step $S^i$, once the corrected temperature has been calculated in a calculating sub-step $C^i$, the result of the calculation, i.e. corrected temperature $$T_c^i,$$

is preferably made available to a line operator. The latter can make the necessary corrections.

Generally speaking, a line setting is adjusted taking into account the calculated corrected temperature $$T_c^i,$$

so that the gloss of value $G_s$ is obtained on the organic coating in the width portion $P^i$ of the moving strip downstream of the Electron-Beam curing device.

Figure 5:
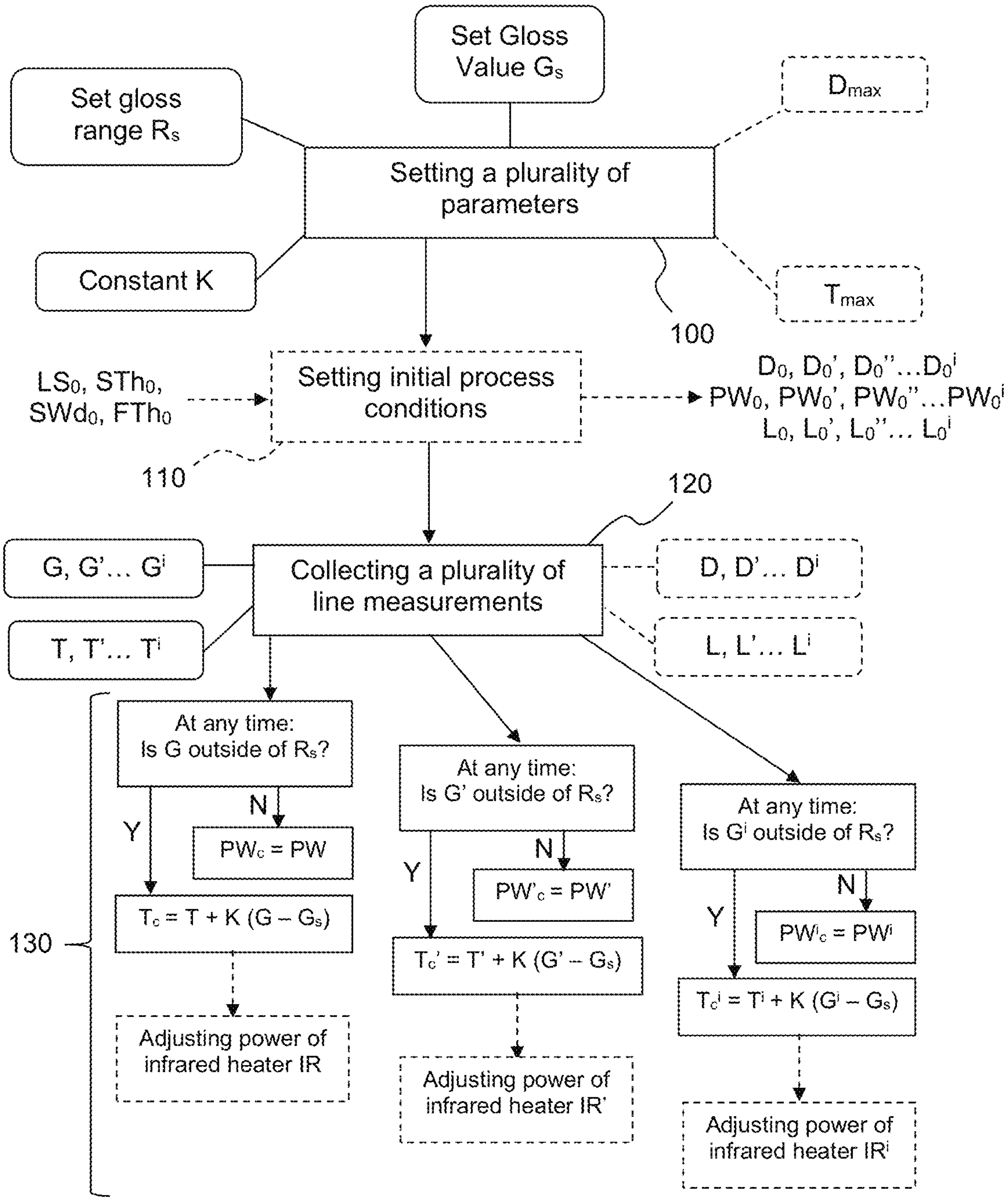

In a first variant illustrated on FIG. 5, for any width portion $P^i$, once the corrected temperature has been calculated, a line setting is adjusted so that the wet film reaches the corrected temperature $$T_c^i$$

in the width portion $P^i$ of the moving strip downstream of the infrared heater $IR^i$ and upstream of the Ultra-Violet curing device. In particular, the power of infrared heater $IR^i$ is adjusted so that the wet film reaches the corrected temperature $$T_c^i$$

in the width portion $P^i$ downstream of infrared heater $IR^i$ and upstream of the Ultra-Violet curing device. Consequently, a gloss of value Gs is obtained on the organic coating in the width portion $P^i$ downstream of the Electron-Beam curing device.

According to a second variant of this embodiment, the Ultra-Violet curing device of the coil-coating line comprises a plurality of independently-controllable UV modules UV, UV', UV" . . . $UV^i$ forming a row substantially parallel to the width of the path P and the collecting step 120 further comprises collecting the UV dose D, D', D" . . . $D^i$ of the UV modules.

In this variant, for any width portion $P^i$, once the corrected temperature $$T_c^i$$

has been calculated, it is compared to the maximum temperature $T_{max}$. If $$T_c^i$$

is inferior to $T_{max}$, then the power of infrared heater $IR^i$ is adjusted so that the wet film reaches the corrected temperature $$T_c^i$$

in the width portion $P^i$ downstream of infrared heater $IR^i$ and upstream of the Ultra-Violet curing device, as in the first variant.

If $$T_c^i$$

is superior to $T_{max}$, and as described in the second embodiment, the correcting step 130 further comprises calculating the corrected UV dose $$D_c^i$$

to which the wet film in the width portion $P^i$ of the moving strip must be exposed in the UV module $UV^i$ according to equation $2^i$:

$$D_c^i = f_1(D^i, G^i, G_s) \tag{$2^i$}$$

Once the corrected UV dose has been calculated, the result of the calculation, i.e. corrected UV dose $$D_c^i,$$

is preferably made available to a line operator. The latter can make the necessary corrections.

Generally speaking, a line setting other than the power of the infrared heater $IR^i$, and than the power of the inductor if applicable, is adjusted taking into account the calculated corrected UV dose $$D_c^i,$$

so that the gloss of value $G_s$ is obtained on the organic coating in the width portion $P^i$ of the moving strip downstream of the Electron-Beam curing device.

In this variant of the embodiment, once the corrected UV dose $$D_c^i$$

has been calculated, the power of the UV module $UV^i$ is adjusted so that the wet film in the width portion $P^i$ of the moving strip is exposed to the UV dose $$D_c^i$$

in the UV module $UV^i$. Consequently, a gloss of value Gs is obtained on the organic coating in the width portion $P^i$ downstream of the Electron-Beam curing device.

According to a third variant of this embodiment, and by comparison to the second variant, each UV module is movable along the path P independently from the others and the collecting step further comprises collecting the lengths L, L', L" . . . $L^i$ between the UV modules and the Electron-Beam curing device.

In this variant, for any width portion $P^i$, once the corrected UV dose $$D_c^i$$

has been calculated, it is compared to the maximum UV dose $D_{max}$. If $$D_c^i$$

is inferior to $D_{max}$, the power of the UV module $UV^i$ is adjusted so that the wet film in the width portion $P_i$ of the moving strip is exposed to the UV dose $$D_c^i$$

in the UV module $UV^i$, as in the second variant.

If $$D_c^i$$

is superior to $D_{max}$, and as described in the third embodiment, the correcting step 130 further comprises calculating the corrected length $$L_c^i$$

between the UV module $UV^i$ and the Electron-Beam curing device according to equation $3^i$:

$$L_c^i = f_2(L^i, G^i, G_s) \quad (3^i)$$

Once the corrected length has been calculated, the result of the calculation, i.e. corrected length $$L_c^i,$$

is preferably made available to a line operator. The latter can make the necessary corrections.

In this variant of the embodiment, once the corrected length $$L_c^i$$

has been calculated, the length between the UV module $UV^i$ and the Electron-Beam curing device is adjusted so that the gloss of value $G_s$ is obtained on the organic coating in the width portion $P^i$ downstream of the Electron-Beam curing device.

Optionally, the initial line setting step 110 differs from the one described in the first embodiment in that, in its second sub-step, the following initial line conditions are set taking into account the process parameters and/or specifications that have been collected in the first sub-step:

- the initial power $PW_0$, $PW_0'$, $PW_0''$ . . . $PW_0^i$ of the infrared heaters IR, IR', IR" . . . $IR^i$,
- the initial UV dose $D_0$, $D_0'$, $D_0''$ . . . $D_0^i$ of the UV modules UV, UV', UV" . . . $UV^i$,
- the initial length $L_0$, $L_0'$, $L_0''$ . . . $L_0^i$ between the UV modules UV, UV', UV" . . . $UV^i$ and the Electron-Beam curing device.

The invention also relates to a method for forming an organic coating on a moving strip on a coil-coating line comprising, sequentially along the path P of the moving strip, a paint applicator, a heating device comprising an infrared heater, an Ultra-Violet curing device and an Electron-Beam curing device, the method comprising the steps of:

- applying a wet film of a radcure paint on the moving strip with the paint applicator,
- heating the wet film of radcure paint in the infrared heater,
- exposing the wet film of radcure paint to UV in the Ultra-Violet curing device,
- curing the wet film of radcure paint in the Electron-Beam device to form the organic coating, the gloss of the organic coating being managed by:

- Setting a set gloss value $G_s$ of the organic coating, a set gloss range $R_s$ of the gloss of the organic coating and a proportionality constant K of a predefined linear mathematical relation between the temperature of the wet film before Ultra-Violet curing and the gloss of the organic coating after Electron-Beam curing,
- Collecting the measure of the temperature T of the wet film in at least a width portion of the moving strip downstream of the infrared heater and upstream of the Ultra-Violet curing device and collecting the measure of the gloss G of the organic coating in the at least a width portion downstream of the Electron-Beam curing device,
- Correcting a deviation of the measured gloss G beyond the set gloss range $R_s$, this correcting step comprising a sub-step of calculating the corrected temperature $T_c$ to be reached by the wet film, in the at least a width portion downstream of the infrared heater and upstream of the Ultra-Violet curing device, according to equation 1:

$$T_c = T + K(G - G_s) \quad (1)$$

All the details provided in relation to the method for managing the gloss and all the details provided in relation to the coil-coating line apply to the method for forming the organic coating.

The invention also relates to a method for manufacturing a prepainted metal, comprising a metal strip and an organic coating, on a coil-coating line comprising, sequentially along the path P of the moving metal strip, a paint applicator, a heating device comprising an infrared heater, an Ultra-Violet curing device and an Electron-Beam curing device, the method comprising the steps of:

- applying a wet film of a radcure paint on the moving metal strip with the paint applicator,
- heating the wet film of radcure paint in the infrared heater,
- exposing the wet film of radcure paint to UV in the Ultra-Violet curing device,
- curing the wet film of radcure paint in the Electron-Beam device to form the organic coating, the gloss of the organic coating being managed by:

Setting a set gloss value $G_s$ of the organic coating, a set gloss range $R_s$ of the gloss of the organic coating and a proportionality constant K of a predefined linear mathematical relation between the temperature of the wet film before Ultra-Violet curing and the gloss of the organic coating after Electron-Beam curing, Collecting the measure of the temperature T of the wet film in at least a width portion of the moving strip downstream of the infrared heater and upstream of the Ultra-Violet curing device and collecting the measure of the gloss G of the organic coating in the at least a width portion downstream of the Electron-Beam curing device, Correcting a deviation of the measured gloss G beyond the set gloss range $R_s$, this correcting step comprising a sub-step of calculating the corrected temperature $T_c$ to be reached by the wet film, in the at least a width portion downstream of the infrared heater and upstream of the Ultra-Violet curing device, according to equation 1:

$$T_c = T + K(G - G_s) \quad (1)$$

All the details provided in relation to the method for managing the gloss and all the details provided in relation to the coil-coating line apply to the method for manufacturing the prepainted metal.

What is claimed is:

1. A method for managing gloss of an organic coating formed by application and curing of a wet film of a radcure paint on a moving strip on a coil-coating line having, sequentially along the path P of the moving strip, a paint applicator, a heating device comprising an infrared heater, an Ultra-Violet curing device and an Electron-Beam curing device, the method comprising the steps of:

setting a set gloss value $G_s$ of the organic coating, a set gloss range $R_s$ of the gloss of the organic coating and a proportionality constant K of a predefined linear mathematical relation between the temperature of the wet film before Ultra-Violet curing and the gloss of the organic coating after Electron-Beam curing;

collecting a measure of the temperature T of the wet film in at least a width portion of the moving strip downstream of the infrared heater and upstream of the Ultra-Violet curing device and collecting a measure of the gloss G of the organic coating in the at least a width portion downstream of the Electron-Beam curing device;

correcting a deviation of the measured gloss G beyond the set gloss range $R_s$, the correcting step including a sub-step of calculating a corrected temperature $T_c$ to be reached by the wet film, in the at least a width portion downstream of the infrared heater and upstream of the Ultra-Violet curing device, according to equation 1:

$$T_c = T + K(G - G_s) \quad (1)$$

2. The method as recited in claim 1 further comprising an initial line setting step wherein:

a plurality of process parameters or of specifications of the strip are collected, at least one initial line condition among the initial power $PW_0$ of the infrared heater, an initial UV dose $D_0$ of the Ultra-Violet curing device and an initial length $L_0$ between the Ultra-Violet curing device and the Electron-Beam curing device is set, taking into account the collected process parameters or specifications of the strip.

3. The method as recited in claim 1 wherein the correcting step further includes adjusting a power of the infrared heater so that the wet film reaches the corrected temperature $T_c$ in the at least a width portion of the moving strip downstream of the infrared heater and upstream of the Ultra-Violet curing device.

4. The method as recited in claim 1 wherein the coil-coating line further includes an inductor upstream of the paint applicator and wherein the correcting step further includes adjusting a power of the inductor so that the wet film reaches the corrected temperature $T_c$ in the at least a width portion of the moving strip downstream of the infrared heater and upstream of the Ultra-Violet curing device.

5. The method as recited in claim 1 wherein:

the Ultra-Violet curing device includes a UV module, the setting step further includes setting a maximum temperature $T_{max}$ for the radcure paint, the collecting step further includes collecting a UV dose D of the UV module, the correcting step further includes the sub-steps of:

evaluating if $T_c$ is superior to $T_{max}$, if not, adjusting a power of the infrared heater so that the wet film reaches the corrected temperature $T_c$ in the at least a width portion of the moving strip downstream of the infrared heater and upstream of the Ultra-Violet curing device, if $T_c$ is superior to $T_{max}$:

calculating the corrected UV dose $D_c$ to which the wet film in the at least a width portion must be exposed in the UV module according to equation 2:

$$D_c = f_1(D, G, G_s) \quad (2)$$

6. The method as recited in claim 5 wherein the correcting step further includes adjusting the power of the UV module so that the wet film in the at least a width portion of the moving strip is exposed to the corrected UV dose $D_c$.

7. The method as recited in claim 6 wherein the correcting step further includes a sub-step of adjusting a setting of the coil-coating line other than the power of the infrared heater taking into account the calculated corrected UV dose $D_c$.

8. The method as recited in claim 5 wherein:

the UV module is movable along the path P, the setting step further includes setting a maximum UV dose $D_{max}$ to which the wet film can be exposed in the UV module, the collecting step further includes collecting a length L between the UV module and the Electron-Beam curing device, the correcting step further includes the sub-steps of:

If $T_c$ is superior to $T_{max}$:

evaluating if $D_c$ is superior to $D_{max}$, if not, adjusting the power of the UV module so that the wet film in the at least a width portion of the moving strip is exposed with the corrected UV dose $D_c$, if $D_c$ is superior to $D_{max}$, calculating a corrected length $L_c$ between the UV module and the Electron-Beam curing device according to equation 3:

$$L_c = f_2(L, G, G_s) \quad (3)$$

9. The method as recited in claim 8 wherein the correcting step further includes adjusting a length between the UV module and the Electron-Beam curing device to the corrected length $L_c$ so that the gloss of value $G_s$ is obtained on the organic coating in the at least a width portion of the moving strip downstream of the Electron-Beam curing device.

10. The method as recited in claim 9 wherein the correcting step further includes a sub-step of adjusting a setting of the coil-coating line taking into account the calculated corrected temperature $T_c^i$.

11. The method as recited in claim 8 wherein the correcting step further includes a sub-step of adjusting a setting of the coil-coating line other than the power of the infrared heater and than the power of the UV module, taking into account the calculated corrected length $L_c$.

12. The method as recited in claim 1 wherein:

the heating device includes a plurality of infrared heaters IR, IR', IR" . . . $IR^i$ forming a row substantially parallel to the width of the path P, the collecting step includes collecting measures of the temperatures T, T', T" . . . $T^i$ of the wet film in a plurality of width portions P, P', P" . . . $P^i$ of the moving strip downstream of the infrared heaters and upstream of the Ultra-Violet curing device and collecting the measures of the glosses G, G', G" . . . $G^i$ of the organic coating in the plurality of width portions P, P', P" . . . $P^i$ downstream of the Electron-Beam curing device, the correcting step includes, for any width portion $P^i$ independently from the others, correcting a deviation of the measured gloss $G^i$ beyond the set gloss range $R_s$, the correcting step being defined as correcting step $S^i$ including a sub-step $C^i$ of calculating the corrected temperature $$T_c^i$$

to be reached by the wet film in the width portion $P^i$ downstream of the infrared heater $IR^i$ and upstream of the Ultra-Violet curing device according to the equation:

$$T_c^i = T^i + K(G^i - G_s) \quad (1^i)$$

13. The method as recited in claim 12 wherein the correcting step further includes adjusting a power of the infrared heater $IR^i$ so that the wet film reaches the corrected temperature $$T_c^i$$

in the width portion $P^i$ of the moving strip downstream of the infrared heater $IR^i$ and upstream of the Ultra-Violet curing device.

14. The method as recited in claim 13 wherein the correcting step further includes a sub-step of adjusting a setting of the coil-coating line other than the power of the infrared heater $IR^i$ taking into account the calculated corrected UV dose $$D_c^i$$

15. The method as recited in claim 12 wherein:

the Ultra-Violet curing device includes a plurality of UV modules UV, UV', UV" . . . $UV^i$ forming a row substantially parallel to the width of the path P, the setting step further includes setting a maximum temperature $T_{max}$ for the radcure paint, the collecting step further includes collecting the UV doses D, D', D" . . . $D^i$ of the UV modules, the correcting step further includes the sub-steps of:

evaluating if $$T_c^i$$

is superior to $T_{max}$, if not, adjusting the power of the infrared heater $IR^i$ so that the wet film reaches the corrected temperature $$T_c^i$$

in the width portion $P^i$ of the moving strip downstream of the infrared heater $IR^i$ and upstream of the Ultra-Violet curing device, if $T_c^i$ is superior to $T_{max}$:

calculating the corrected UV dose $$D_c^i$$

to which the wet film in the width portion $P^i$ must be exposed in the UV module $UV^i$ according to equation $2^i$:

$$D_c^i = f_1(D^i, G^i, G_s) \quad (2^i)$$

16. The method as recited in claim 15 wherein the correcting step further includes adjusting the power of the UV module $UV^i$ so that the wet film in the width portion $P^i$ of the moving strip is exposed to the corrected UV dose $D_c^i$.

17. The method as recited in claim 15 wherein:

the UV modules are movable along the path P independently from one another, the setting step further includes setting a maximum UV dose $D_{max}$ to which the wet film can be exposed in the UV modules, the collecting step further includes collecting lengths L, L', L" . . . $L^i$ between the UV modules and the Electron-Beam curing device, the correcting step further includes the sub-steps of:

if $$T_c^i$$

is superior to $T_{max}$:

evaluating if $$D_c^i$$

is superior to $D_{max}$:

if not, adjusting the power of the UV module $UV^i$ so that the wet film in the width portion $P^i$ of the moving strip is exposed to the UV dose $$D_c^i$$

in the UV module $UV^i$, if $$D_c^i$$

is superior to $D_{max}$, calculating the corrected length $$L_c^i$$

between the UV module $UV^i$ and the Electron-Beam curing device according to equation $3^i$:

$$L_c^i = f_2(L^i, G^i, G_s) \tag{3}$$

18. The method as recited in claim 17 wherein the correcting step further comprises adjusting the length between the UV module $UV^i$ and the Electron-Beam curing device so that the gloss of value $G_s$ is obtained on the organic coating in the width portion $P^i$ downstream of the Electron-Beam curing device.

19. The method as recited in claim 1 wherein the correcting step further includes a sub-step of adjusting a setting of the coil-coating line taking into account the calculated corrected temperature $T_c$.

20. A coil-coating line comprising:

a paint applicator, a heating device including an infrared heater downstream of the paint applicator, and an Ultra-Violet curing device and an Electron-Beam curing device, downstream of the heating device, the coil-coating line further comprising a gloss management tool for managing gloss of an organic coating formed by application and curing of a wet film of a radcure paint on a moving strip on the coil-coating line, the gloss management tool including:

a setting module setting a set gloss value $G_s$ of the organic coating, a set gloss range $R_s$ of the gloss of the organic coating and a proportionality constant K of a predefined linear mathematical relation between the temperature of the wet film before Ultra-Violet curing and the gloss of the organic coating after Electron-Beam curing, an acquisition module collecting the measure of the temperature T of the wet film in at least a width portion of the moving strip downstream of the infrared heater and upstream of the Ultra-Violet curing device and for collecting the measure of the gloss G of the organic coating in the at least a width portion downstream of the Electron-Beam curing device, and a correction module correcting a deviation of the measured gloss G beyond the set gloss range $R_s$, the correction comprising calculating the corrected temperature $T_c$ to be reached by the wet film, in the at least a width portion downstream of the infrared heater and upstream of the Ultra-Violet curing device, according to equation 1:

$$T_c = T + K(G - G_s) \tag{1}$$

21. A method for forming an organic coating on a moving strip on a coil-coating line having, sequentially along the path P of the moving strip, a paint applicator, a heating device comprising an infrared heater, an Ultra-Violet curing device and an Electron-Beam curing device, the method comprising the steps of:

applying a wet film of a radcure paint on the moving strip with the paint applicator;

heating the wet film of radcure paint in the infrared heater;

exposing the wet film of radcure paint to UV in the Ultra-Violet curing device;

curing the wet film of radcure paint in the Electron-Beam device to form the organic coating;

a gloss of the organic coating being managed by:

setting a set gloss value $G_s$ of the organic coating, a set gloss range $R_s$ of the gloss of the organic coating and a proportionality constant K of a predefined linear mathematical relation between the temperature of the wet film before Ultra-Violet curing and the gloss of the organic coating after Electron-Beam curing, collecting a measure of the temperature T of the wet film in at least a width portion of the moving strip downstream of the infrared heater and upstream of the Ultra-Violet curing device and collecting a measure of the gloss G of the organic coating in the at least a width portion downstream of the Electron-Beam curing device, and correcting a deviation of the measured gloss G beyond the set gloss range $R_s$, this correcting step including a sub-step of calculating the corrected temperature $T_c$ to be reached by the wet film, in the at least a width portion downstream of the infrared heater and upstream of the Ultra-Violet curing device, according to equation 1:

$$T_c = T + K(G - G_s) \tag{1}$$

* * * * *